(12) United States Patent
Leung

(10) Patent No.: US 7,746,874 B1
(45) Date of Patent: Jun. 29, 2010

(54) DYNAMIC NETWORK ALLOCATION FOR MOBILE ROUTER

(75) Inventor: Kent K. Leung, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 1303 days.

(21) Appl. No.: 11/213,468

(22) Filed: Aug. 25, 2005

Related U.S. Application Data

(62) Division of application No. 09/746,409, filed on Dec. 20, 2000, now Pat. No. 6,959,341.

(51) Int. Cl.
*H04L 12/28* (2006.01)

(52) U.S. Cl. ............. 370/400; 370/328; 370/389; 370/351; 370/466; 709/225

(58) Field of Classification Search .......... 370/400.328, 370/389, 351, 466, 328; 709/225
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,572,528 A | 11/1996 | Shuen | |
| 5,572,582 A | 11/1996 | Riddle | |
| 5,619,552 A | 4/1997 | Karppanen et al. | |
| 5,729,537 A | 3/1998 | Billstrom | |
| 5,793,762 A | 8/1998 | Penners et al. | |
| 5,825,759 A | 10/1998 | Liu | |
| 5,862,345 A * | 1/1999 | Okanoue et al. | 709/238 |
| 6,078,575 A | 6/2000 | Dommety et al. | |
| 6,130,892 A * | 10/2000 | Short et al. | 370/401 |
| 6,160,804 A * | 12/2000 | Ahmed et al. | 370/349 |
| 6,195,705 B1 | 2/2001 | Leung | |
| 6,230,012 B1 | 5/2001 | Willkie et al. | |
| 6,339,830 B1 | 1/2002 | See et al. | |

(Continued)

FOREIGN PATENT DOCUMENTS

WO 03/043226 5/2003

(Continued)

OTHER PUBLICATIONS

Author: C. Perkins Title: RFC__2002 Date: Oct. 1996 IETF.*

(Continued)

*Primary Examiner*—Ayaz R Sheikh
*Assistant Examiner*—Andrew C Lee
(74) *Attorney, Agent, or Firm*—Weaver Austin Villeneuve & Sampson LLP

(57) ABSTRACT

Methods and apparatus for implementing a Home Agent supporting Mobile IP and being capable of allocating one or more networks to a mobile router which registers with the Home Agent comprise receiving a registration request packet from the mobile router, the registration request packet indicating one or more networks being requested by the mobile router from the Home Agent. The one or more networks are allocated to the mobile router corresponding to the one or more networks being requested by the mobile router from the Home Agent. A registration reply packet identifying the one or more networks allocated to the mobile router is then sent to the mobile router.

62 Claims, 7 Drawing Sheets

U.S. PATENT DOCUMENTS

| | | | |
|---|---|---|---|
| 6,370,142 B1 | 4/2002 | Pitcher et al. | |
| 6,393,482 B1 * | 5/2002 | Rai et al. | 709/225 |
| 6,407,988 B1 | 6/2002 | Agraharam et al. | |
| 6,434,134 B1 * | 8/2002 | La Porta et al. | 370/338 |
| 6,473,411 B1 * | 10/2002 | Kumaki et al. | 370/331 |
| 6,487,406 B1 * | 11/2002 | Chang et al. | 455/422.1 |
| 6,490,285 B2 | 12/2002 | Lee et al. | |
| 6,510,153 B1 * | 1/2003 | Inoue et al. | 370/354 |
| 6,512,754 B2 | 1/2003 | Feder et al. | |
| 6,515,974 B1 | 2/2003 | Inoue et al. | |
| 6,535,493 B1 * | 3/2003 | Lee et al. | 370/329 |
| 6,549,522 B1 | 4/2003 | Flynn | |
| 6,560,217 B1 * | 5/2003 | Peirce et al. | 370/351 |
| 6,567,664 B1 | 5/2003 | Bergenwall et al. | |
| 6,571,289 B1 | 5/2003 | Montenegro | |
| 6,587,882 B1 * | 7/2003 | Inoue et al. | 709/227 |
| 6,606,316 B1 | 8/2003 | Albert et al. | |
| 6,629,137 B1 | 9/2003 | Wynn | |
| 6,633,761 B1 | 10/2003 | Singhai et al. | |
| 6,636,498 B1 | 10/2003 | Leung | |
| 6,697,360 B1 | 2/2004 | Gai et al. | |
| 6,731,621 B1 | 5/2004 | Mizutani et al. | |
| 6,738,362 B1 * | 5/2004 | Xu et al. | 370/329 |
| 6,747,961 B1 | 6/2004 | Ahmed et al. | |
| 6,766,168 B1 | 7/2004 | Lim | |
| 6,804,221 B1 | 10/2004 | Magret et al. | |
| 6,842,462 B1 * | 1/2005 | Ramjee et al. | 370/466 |
| 6,862,274 B1 | 3/2005 | Tsao et al. | |
| 6,892,069 B1 * | 5/2005 | Flynn | 455/432.1 |
| 6,904,025 B1 * | 6/2005 | Madour et al. | 370/328 |
| 6,934,274 B2 * | 8/2005 | Inoue et al. | 370/338 |
| 6,944,181 B2 | 9/2005 | Inoue et al. | |
| 6,954,790 B2 * | 10/2005 | Forslow | 709/227 |
| 6,959,341 B1 | 10/2005 | Leung | |
| 6,970,459 B1 * | 11/2005 | Meier | 370/389 |
| 6,973,057 B1 | 12/2005 | Forslow | |
| 6,973,309 B1 * | 12/2005 | Rygula et al. | 455/436 |
| 6,988,146 B1 | 1/2006 | Magret et al. | |
| 7,006,472 B1 * | 2/2006 | Immonen et al. | 370/332 |
| 7,079,499 B1 | 7/2006 | Akhtar et al. | |
| 7,107,620 B2 * | 9/2006 | Haverinen et al. | 726/29 |
| 7,155,518 B2 * | 12/2006 | Forslow | 709/227 |
| 7,218,634 B1 * | 5/2007 | Khalil et al. | 370/392 |
| 7,295,551 B1 | 11/2007 | Leung et al. | |
| 7,346,053 B1 | 3/2008 | Leung et al. | |
| 7,352,731 B1 | 4/2008 | Leung | |
| 7,362,727 B1 * | 4/2008 | O'Neill et al. | 370/331 |
| 7,580,391 B1 | 8/2009 | Leung | |
| 2001/0022781 A1 | 9/2001 | Makipaa | |
| 2001/0041571 A1 | 11/2001 | Yuan | |
| 2002/0069278 A1 * | 6/2002 | Forslow | 709/225 |
| 2002/0075878 A1 | 6/2002 | Lee et al. | |
| 2002/0186693 A1 | 12/2002 | Inoue et al. | |
| 2003/0018715 A1 | 1/2003 | O'Neill | |
| 2003/0117965 A1 | 6/2003 | Markki et al. | |
| 2003/0174688 A1 | 9/2003 | Ahmed et al. | |
| 2004/0013099 A1 | 1/2004 | O'Neill | |
| 2007/0104170 A1 | 5/2007 | Leung et al. | |

OTHER PUBLICATIONS

T. Li, B. Cole, P. Morton, and D. Li, "*Cisco Hot Standby Router Protocol (HSRP),*" Mar. 1998, Network Working Group RFC 2281 (http://ftp.ietf.org/rfc/rfc2281.txt?number=2281).

Release notes for 3Com Corporation, "*Conducting a Redundant Route for Network Resiliency*", Mar. 1994, *NET Builder Family Bridge/Router*, pp. 26-29.

C. Perkins, "*IP Mobility support,*" IBM Corporation, Oct. 1996.

"*Mobile IP*", Release 12.0(1)T, pp. 1-55.

Uyless Black, "*TCP/IP and Related Protocols*", 1992, *McGraw-Hill, Inc.*, pp. 226-249.

Chambless, et al., "*Home Agent Redundancy Protocol (HARP)*", Oct. 27, 1997.

Networking Working Group, RFC 2002 "*IP Mobility Support*", Oct. 1996.

Montenegro, G., "*Reverse Tunneling for Mobile IP,*" RFC 2344, Sun Microsystems, Inc., pp. 1-19, May 1998.

D. Harkins and D. Carrel, "*The Internet Key Exchange (IKE),*" Cisco Systems, pp. 1-33, Jun. 1998.

D. Cong and M. Hamlen, and C. Perkins, "*The Definitions of Managed Objects for IP Mobility Support using SMIv2,*" RFC2006, Motorola and IBM, pp. 1-52, Oct. 1996.

J. Moy, RFC 1247 "*OSPF Version 2*", Jul. 19, 1991.

D. Oran, RFC 1142 "OSI IS-IS Intra-domain Routing Protocol", Feb. 1990.

C. Finseth, "*An Access Control Protocol, Sometimes Called TACACS,*" RFC1492, pp. 1-15, Sep. 13, 1992.

D. Carrel and Lol Grant, "*The TACACS+ Protocol,*" Network Working Group, Internet-Draft, Cisco Systems, pp. 1-42, Jan. 1997.

C. Rigney, "*RADIUS Accounting,*" RFC 2139, Livingston, pp. 1-25, Apr. 1997.

C. Rigney, et al., "*Remote Authentication Dial in User Service (RADIUS),*" RFC 2138, pp. 1-65 Apr. 1997.

K. Leung, U.S. Appl. No. 09/746,409, filed Dec. 20, 2000, "Dynamic Network Allocation for Mobile Router,".

Office Action dated Jul. 5, 2007 from related U.S. Appl. No. 11/646,230, 13 pgs.

Final Office Action dated Nov. 13, 2007 from related U.S. Appl. No. 11/646,230, 16 pgs.

Office Action dated Jan. 11, 2008 from related U.S. Appl. No. 11/213,590, 13 pgs.

Office Action dated Aug. 21, 2008 from related U.S. Appl. No. 11/213,590, 14 pgs.

Office Action dated Sep. 15, 2008 from related U.S. Appl. No. 11/646,230, 15 pgs.

U.S. Office Action dated Feb. 13, 2009 from U.S. Appl. No. 11/646,230, 18 pgs.

\* cited by examiner

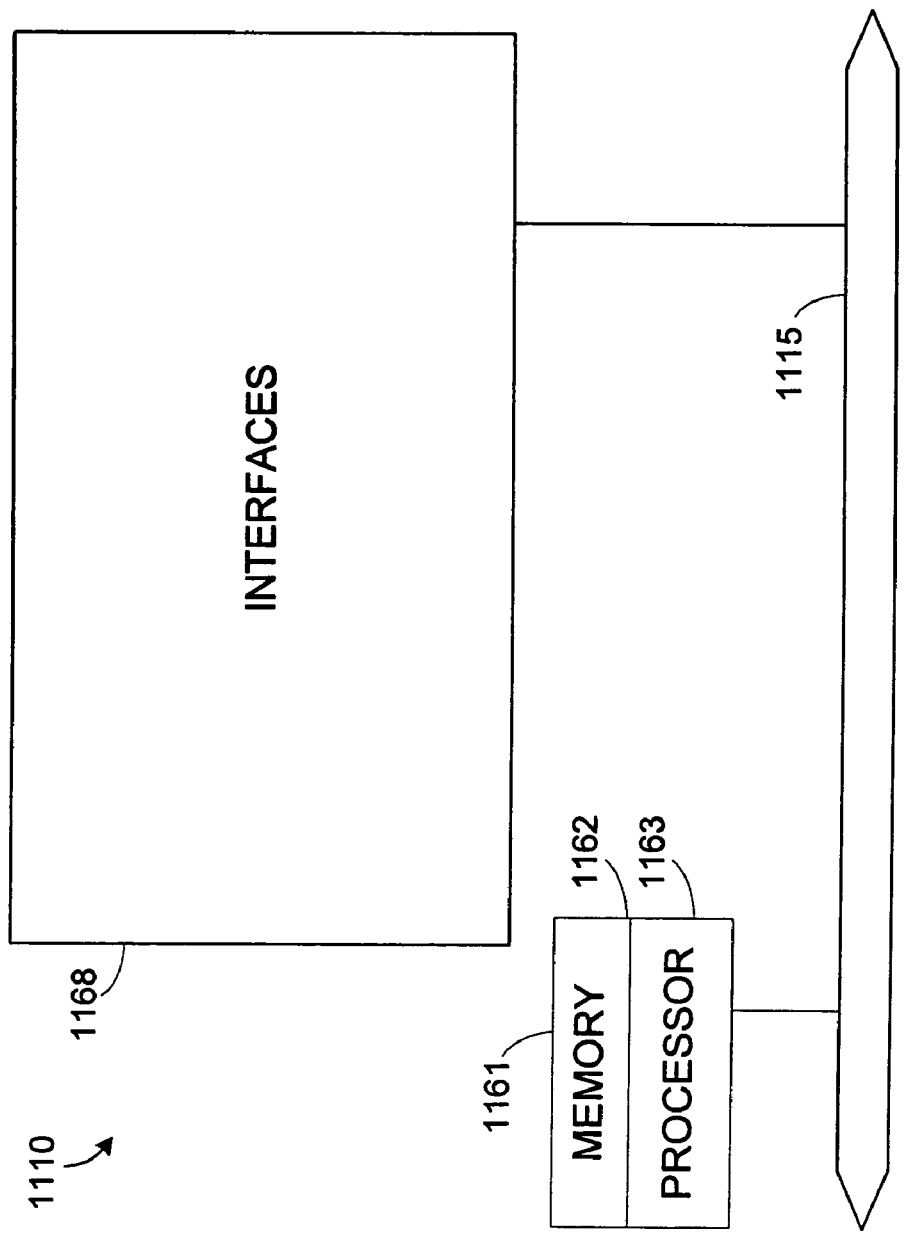

DYNAMIC NETWORK ALLOCATION FOR MOBILE ROUTER

CROSS REFERENCE TO RELATED APPLICATIONS

This application is a divisional of U.S. patent application Ser. No. 09/746,409, filed Dec. 20, 2000 now U.S. Pat. No. 6,959,341 naming Kent K. Leung as inventor, and entitled, "DYNAMIC NETWORK ALLOCATION FOR MOBILE ROUTER," which is incorporated herein by reference for all purposes.

This application is also related to U.S. patent application Ser. No. 09/227,396, naming Kent K. Leung as inventor, and entitled "MOBILE IP MOBILE ROUTER," which is incorporated herein by reference in its entirety and for all purposes.

BACKGROUND OF THE INVENTION

1. Field of the Invention

The present invention relates to Mobile IP network technology. More particularly, the present invention relates to dynamic network allocation for a Mobile IP mobile router.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

In addition to providing connectivity to a mobile node, it may be desirable to provide for the mobility of one or more networks moving together, such as on an airplane or a ship. RFC 2002 section 4.5 discusses the possibility of implementing mobile routers.

In one approach suggested in RFC 2002 section 4.5, a Home Agent is configured to have a permanent registration for each fixed node. For instance, a mobile router may support multiple nodes which may be fixed with respect to the mobile router. In order to receive communication from a corresponding node, messages must be routed to the appropriate fixed node. As the RFC suggests, a Home Agent may be configured to have a permanent registration for each fixed node. By way of example, the permanent registration may indicate the mobile router's address as the care-of address. Thus, a separate mapping table may associate the IP address of each of the fixed nodes with the mobile router. However, this is problematic since the mapping table is typically configured while the mobile router is coupled to the Home Agent. In other words, the routing table is static. Suppose a person boards an airplane and wishes to connect a laptop to the airplane's "mobile network" via the mobile router. If a new node is added to the mobile router after the airplane leaves the airport, the IP address of this new node may not be added to the mapping table. As a result, communication cannot be received by this new node via the mobile router. In addition, since the mobile router 20 may accommodate thousands of devices, or nodes, there would potentially be an enormous number of entries to store in such a mapping table for these nodes. Moreover, such a mapping table may include entries for multiple mobile routers. Accordingly, such a mapping table would consume a substantial amount of memory as well as be cumbersome to search.

FIG. 2 is a block diagram illustrating a system in which a mobile router is implemented. As shown, when a mobile router 202 roams to a first Foreign Agent 204, it registers with its Home Agent 206 so that it may receive packets from a corresponding node 208. When the mobile router 202 subsequently roams to a second Foreign Agent 210, it again registers with its Home Agent 206. In this manner, a device 212 that has connected to the mobile router 202 may communicate via the internet 4 by connecting to a network 214 of the mobile router 202.

Address space is a precious resource. For mobile routers which have one or more associated networks, address space is consumed even more quickly than for individual nodes. More particularly, IP addresses for entire networks rather than single nodes must be allocated. According to current mobile router implementation schemes, the Home Agent is configured with those networks that are connected to the mobile router. Thus, address space is typically allocated statically for entire networks.

An airplane is an exemplary scenario in which a mobile router may be implemented. For instance, each plane may have a mobile router (and therefore many networks) on board to provide Internet connectivity and services. Statically allocating address space to these networks is an efficient mechanism for configuring the Home Agent with the information it needs to forward messages to a mobile router supported by the Home Agent. However, since not all planes may be active (i.e., flying) simultaneously, it would be beneficial to only allocate subnets to active planes.

In view of the above, it would be desirable to have improved techniques for implementing network allocation for a Mobile IP mobile router.

SUMMARY OF THE INVENTION

The present invention enables networks to be allocated dynamically to a mobile router. This is accomplished, in part, through a request for one or more networks from the mobile router. Thus, networks are allocated only to active routers. In this manner, address space is conserved.

In accordance with one aspect of the invention, a Home Agent is configured to allocate one or more networks to a mobile router that registers with the Home Agent. To initiate the allocation process, a registration request packet is received from the mobile router. The registration request packet indicates one or more networks being requested by the mobile router from the Home Agent. The one or more networks are allocated to the mobile router corresponding to the one or more networks being requested by the mobile router from the Home Agent. A registration reply packet identifying the one or more networks allocated to the mobile router is then sent to the mobile router.

In accordance with another aspect of the invention, a mobile router is configured to request one or more networks from a Home Agent during registration. The mobile router composes a registration request packet indicating one or more networks being requested by the mobile router from a Home Agent. The registration request packet is sent to the Home Agent. A registration reply packet identifying one or more networks allocated to the mobile router by the Home Agent is then received by the mobile router. The mobile router may then configure its interfaces with IP addresses selected from the allocated networks.

BRIEF DESCRIPTION OF THE DRAWINGS

FIG. 7 is a block diagram of a network device that may be configured to implement aspects of the present invention.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
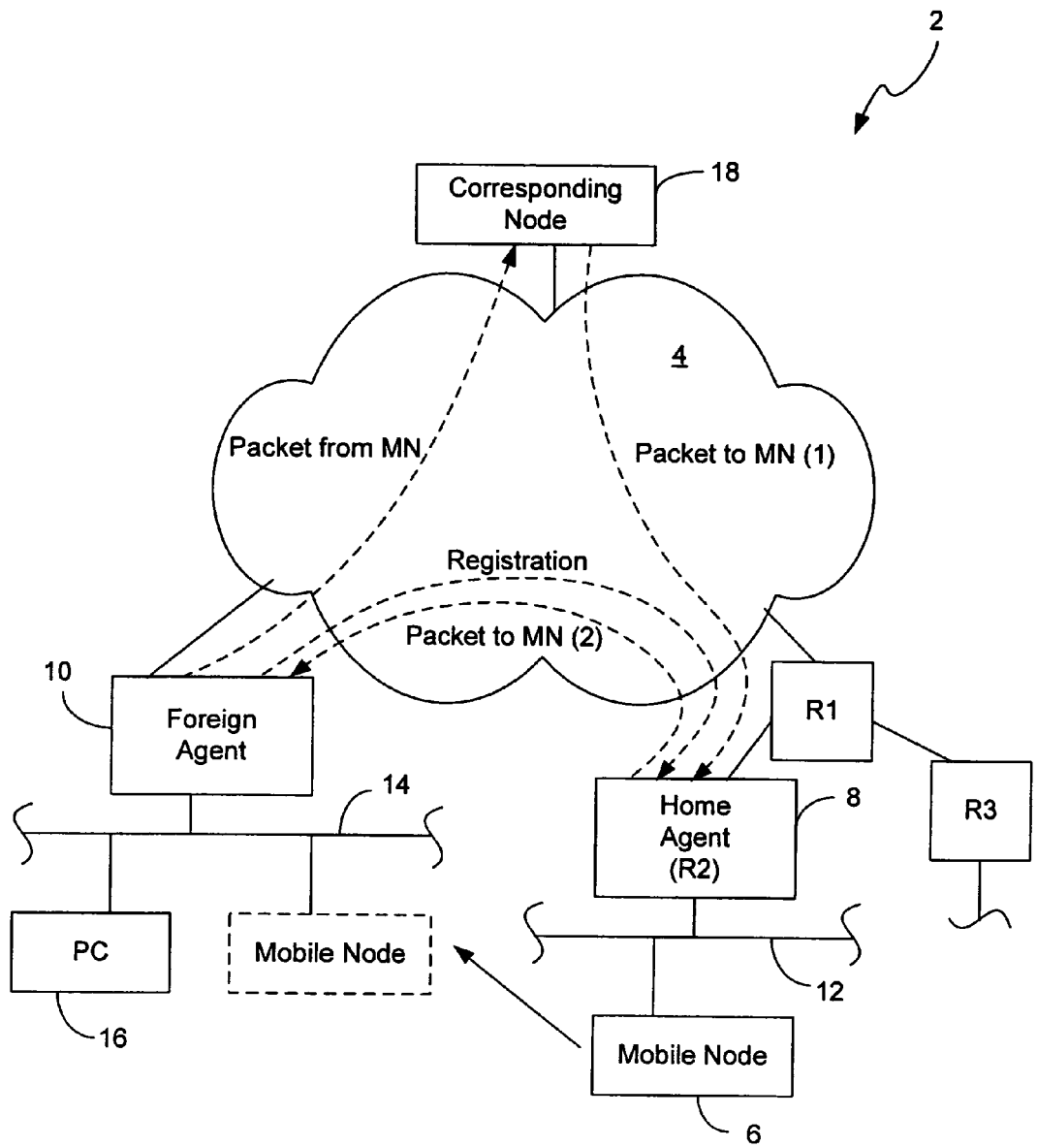
FIG. 1 is a diagram of a Mobile 1P network segment and associated environment.
Figure 2:
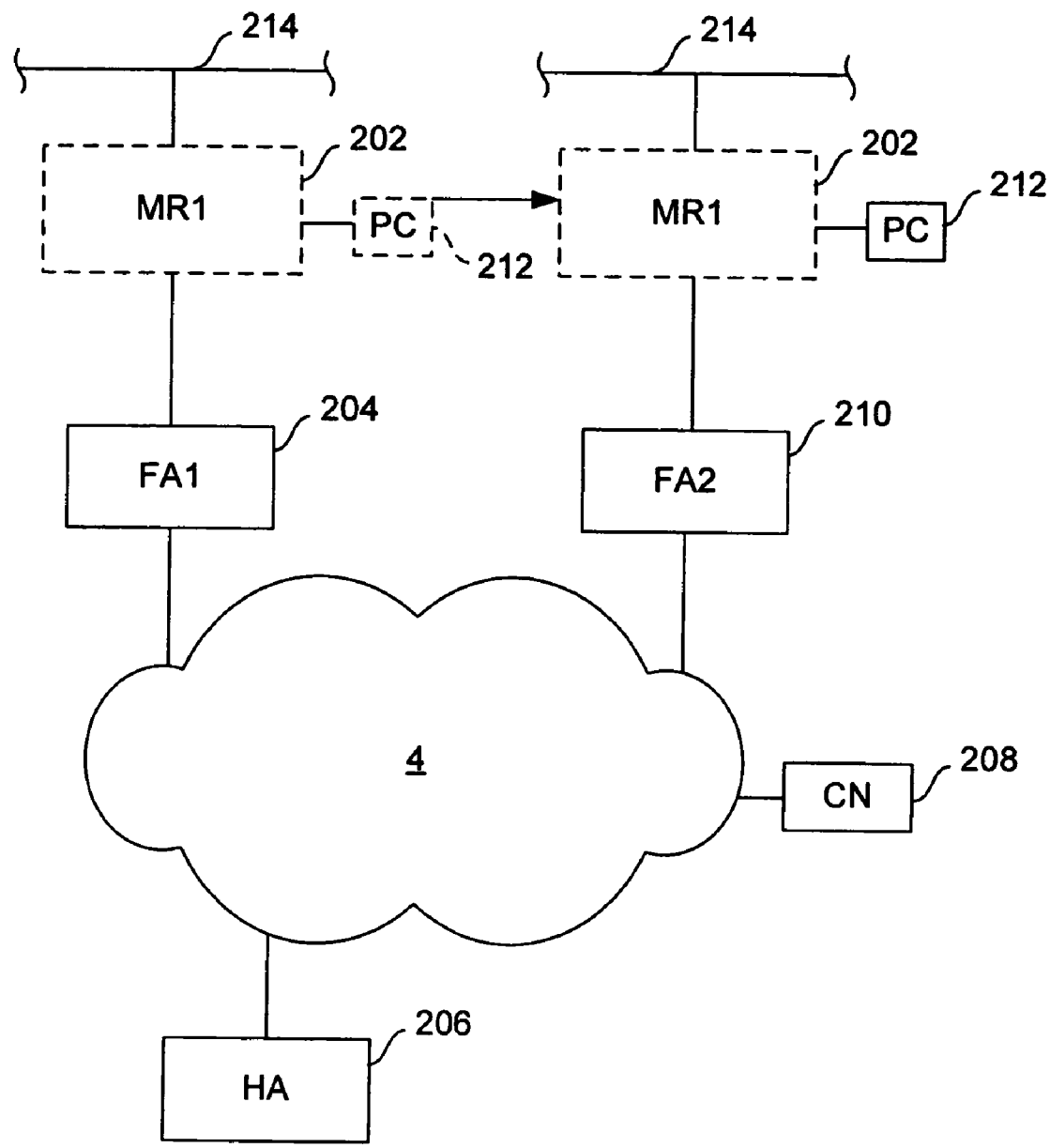
FIG. 2 is a system diagram illustrating a system in which a mobile router is implemented.
Figure 3A:
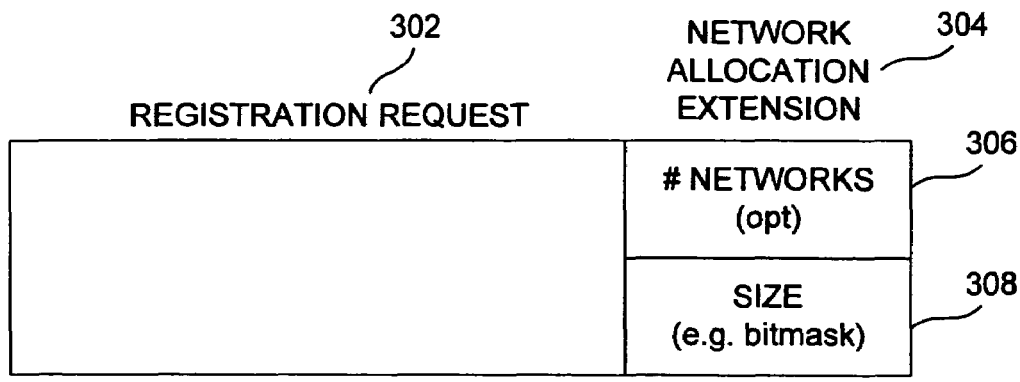
FIG. 3A is a diagram illustrating an exemplary registration request that may be sent in accordance with one embodiment of the invention.

The present invention enables dynamic network allocation and deallocation. More particularly, in accordance with one embodiment, this is accomplished through a network allocation extension to the registration request packet. FIG. 3A is a diagram illustrating an exemplary registration request that may be sent in accordance with one embodiment of the invention. As shown, a registration request packet 302 includes a network allocation extension 304 indicating one or more networks being requested by the mobile router from the Home Agent. More particularly, in the network allocation extension 304, the mobile router may optionally indicate a number of subnets 306 being requested by the mobile router. In addition, the network allocation extension 304 may also include a size 308 of the one or more networks being requested by the mobile router from the Home Agent. For instance, the mobile router may separately indicate a number of networks and a size of each of the networks requested. Alternatively, the mobile router may merely indicate a size or subnet mask for each network. In other words, the mobile router may specify three sizes, therefore implying that three networks are requested. Similarly, the mobile router may specify a single size, which may be divided into multiple networks.

Figure 3B:
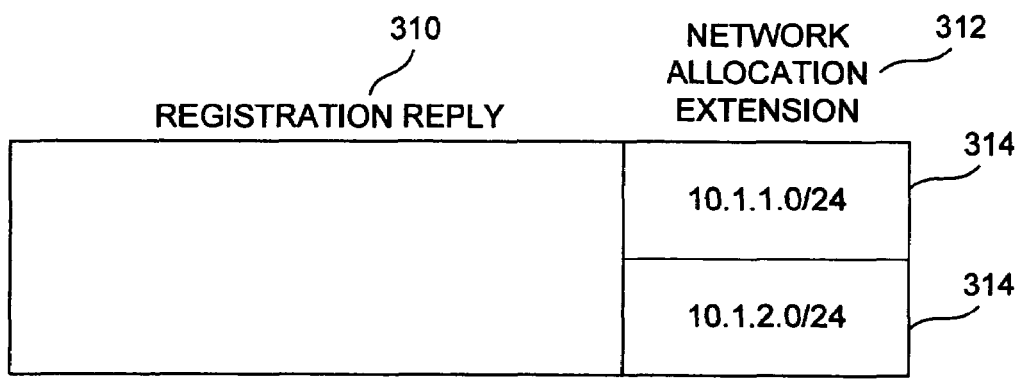
FIG. 3B is a diagram illustrating an exemplary registration reply that may be sent by the Home Agent in accordance with one embodiment of the invention.

When the requested address space has been allocated for use by the mobile router, the Home Agent sends a registration reply packet identifying the allocated networks. FIG. 3B is a diagram illustrating an exemplary registration reply that may be sent by the Home Agent in accordance with one embodiment of the invention. As shown, a registration reply packet 310 that includes a network allocation extension 312 identifying the one or more networks 314 that have been allocated to the mobile router.

Figure 4:
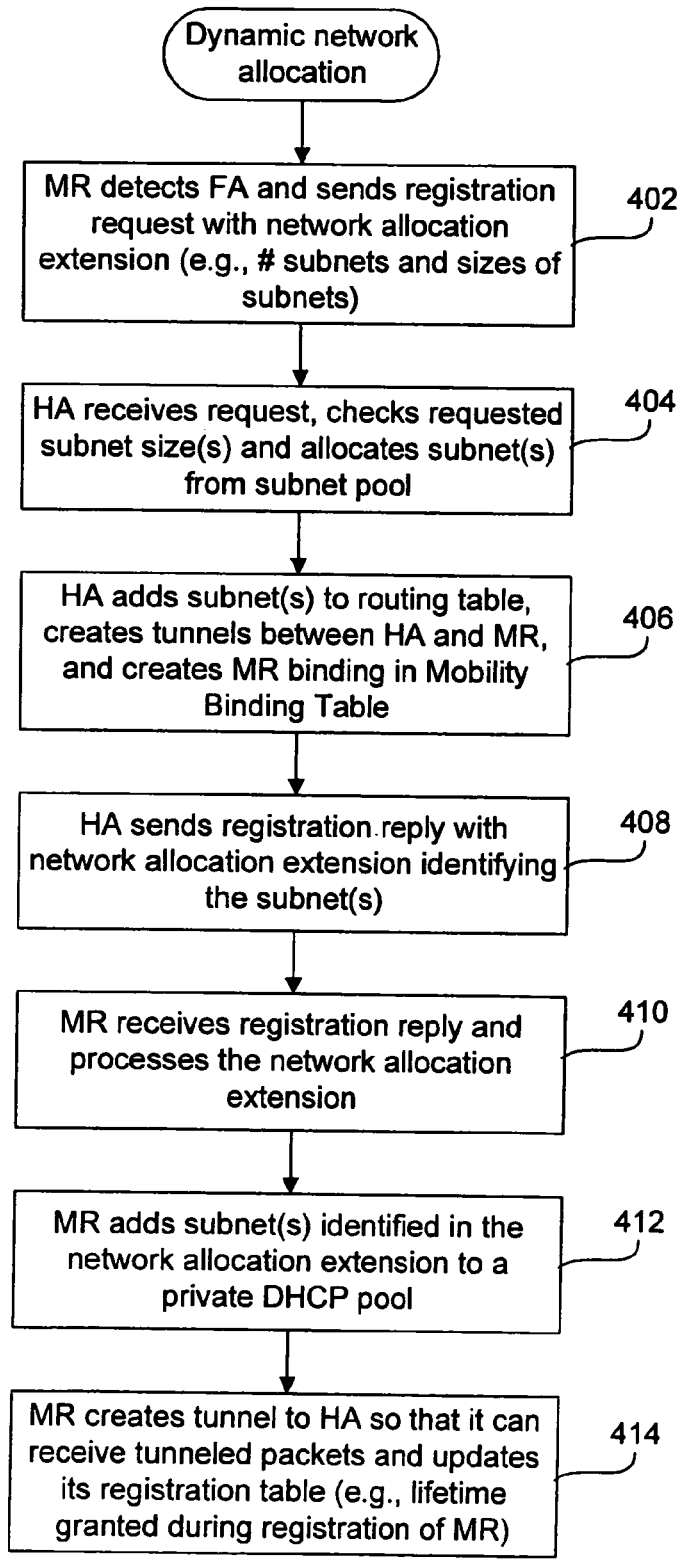
FIG. 4 is a process flow diagram illustrating one method of dynamic network allocation during registration of a mobile router in accordance with one embodiment of the invention.

FIG. 4 is a process flow diagram illustrating one method of dynamic network allocation during registration of a mobile router in accordance with one embodiment of the invention. As shown at block 402, when a mobile router roams to (or detects) a Foreign Agent, it composes and sends a registration request packet to its Home Agent. As described above, the registration request packet includes a network allocation extension. When the Home Agent receives the registration request packet, it allocates the one or more networks to the mobile router corresponding to the network allocation extension of the registration request packet at block 404. More particularly, the Home Agent obtains the information from the network allocation extension (e.g., subnet sizes) and allocates the appropriate network(s) from a pool of available networks. For instance, the pool may be a local pool that is managed by the Home Agent.

Rather than requiring the Home Agent to manage the pool of available networks, the pool of available networks may be managed by a server that is external to the Home Agent. For instance, a class of servers known as "AAA" or triple-A servers may be employed. The AAA represents authentication, authorization, and accounting. While authentication determines "who" an entity is, authorization determines what services a user is allowed to perform, or access. Various protocols such as the Remote Authentication Dial In User Service (RADIUS) and TACACS+ may be implemented to provide such a server. RFC 2138 describes the RADIUS Protocol and is hereby incorporated by reference. Similarly, RFC 1492 describes TACACS and the Internet-Draft "The TACACS+ Protocol Version 1.78," available at http://www.ietforg/internet-drafts/draft-grant-tacacs-02.txt, describes TACACS+. Both of these documents are incorporated herein by reference for all purposes.

Alternatively, a DHCP (Dynamic Host Configuration Protocol) server may be employed. DHCP is a protocol that lets network administrators manage centrally and automate the assignment of Internet Protocol (IP) addresses in an organization's network. DHCP uses the concept of a "lease" or amount of time that a given IP address will be valid for a computer. The lease time can vary depending on how long a mobile router or user is likely to require the Internet connection at a particular location. Using very short leases, DHCP can dynamically reconfigure networks in which there are more computers than there are available IP addresses.

Once the networks have been allocated to the mobile router, the Home Agent adds the subnet(s) to a routing table at block 406. More particularly, the routing table is updated to include one or more entries for the one or more networks that are allocated to the mobile router. Each entry in the routing table includes a care-of address associated with the one or more networks. For instance, each entry may include a network IP address, a next hop router IP address to the care-of address for the network, and an interface. In addition to updating the routing table, the Home Agent also creates a tunnel between the Home Agent and the mobile router. In addition, it creates a binding entry in the Mobility Binding Table to enable the Home Agent to identify the current location (i.e., Foreign Agent) to which the mobile router has roamed. More particularly, the Home Agent updates the Mobility Binding Table to associate the mobile router with a care-of address.

When the Home Agent has determined that registration of the mobile router is accepted, the Home Agent composes and sends a registration reply packet including a network allocation extension identifying the allocated subnet(s) at block 408. When the mobile router receives the registration reply packet identifying one or more networks allocated to it by the Home Agent, it process the network allocation extension at block 410. More particularly, the mobile router selects from the one or more allocated networks an IP address and configures an interface of the mobile router with the IP address such that a network coupled to the interface is identified by the IP address. In addition, the mobile router adds the networks identified in the network allocation extension to a private DHCP pool available to the mobile router at block 412, thereby enabling the mobile router to manage networks allocated to it. At block 414, the mobile router also creates a tunnel to the Home Agent so that it can receive tunneled packets and updates its registration table to indicate a lifetime granted during registration of the mobile router with the Home Agent.

When the networks are no longer used by the mobile router, they are deallocated. Deallocation of allocated networks may occur in two instances. First, deallocation may occur upon deregistration of the mobile router with the Home Agent. Second, deallocation may occur when the lifetime of the mobile router expires.

Figure 5:
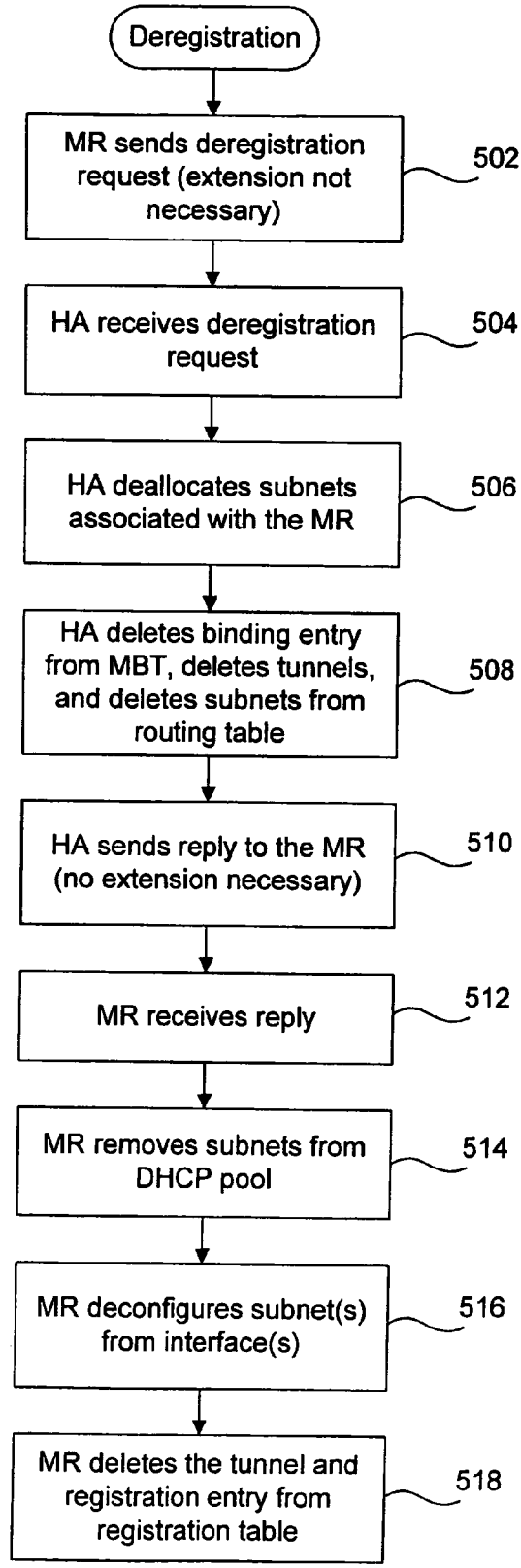
FIG. 5 is a process flow diagram illustrating one method of deallocating networks during deregistration of a mobile router in accordance with one embodiment of the invention.

FIG. 5 is a process flow diagram illustrating one method of deallocating networks during deregistration of a mobile router in accordance with one embodiment of the invention. At block 502, the mobile router sends a deregistration request to the Home Agent. The Home Agent receives the deregistration request at block 504 and deallocates the subnets associated with the mobile router at block 506. For instance, this deallocation process may involve replacing the networks to a pool of available networks. The Home Agent then completes the deregistration process at block 508 by updating the Mobility Binding Table to remove the association between the mobile router and the care-of address. In addition, the appropriate entries and/or networks are removed from the routing table. deleting the tunnel to the mobile router, and deleting the appropriate networks. The Home Agent then sends a deregistration reply to the mobile router to indicate that deregistration of the mobile router is complete as shown at block 510.

When the mobile router receives the deregistration reply at block 512, it removes the one or more networks previously allocated to it from its private DHCP pool at block 514. In addition, it deconfigures the appropriate interfaces so that they will no longer be identified by the previously configured IP addresses at block 516. At block 518 the mobile router deletes the tunnel to the Home Agent and updates its registration table to delete the appropriate entry from its registration table.

Figure 6:
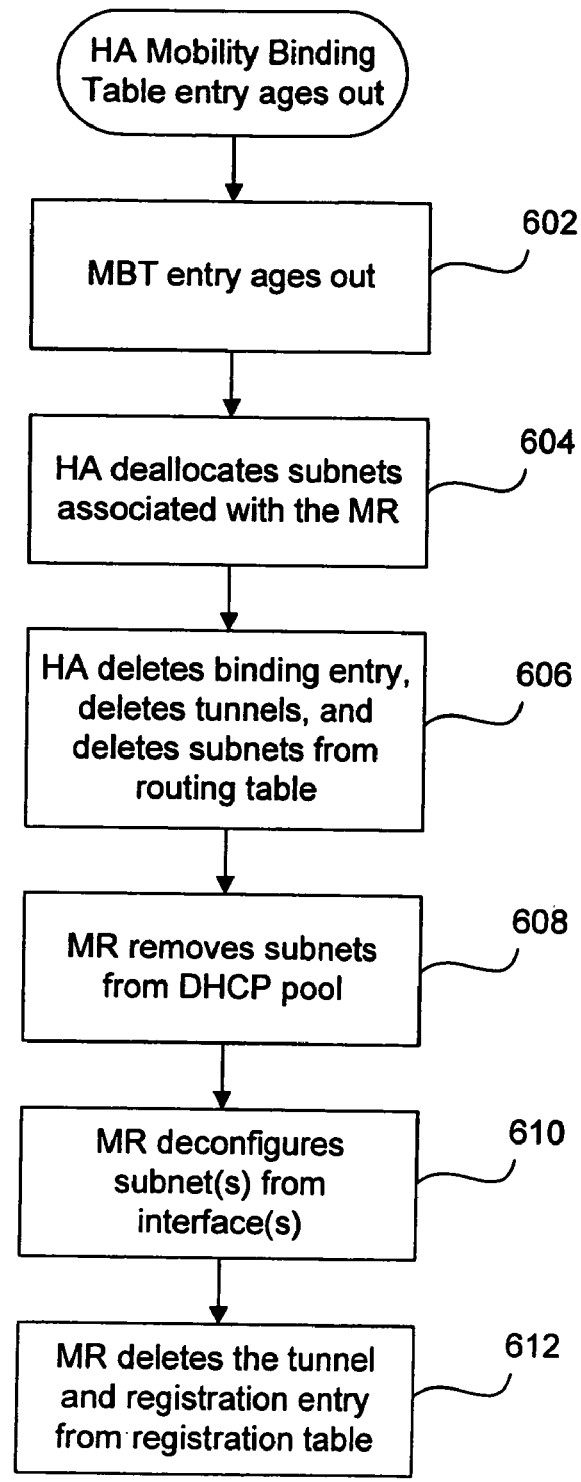
FIG. 6 is a process flow diagram illustrating one method of deallocating networks when a lifetime of the mobile router has expired in accordance with one embodiment of the invention.

As described above, a second way in which deallocation of networks allocated to the mobile router may be performed is automatically when the lifetime of the mobile router has expired. FIG. 6 is a process flow diagram illustrating one method of deallocating networks when a lifetime of the mobile router has expired in accordance with one embodiment of the invention. When the lifetime of the mobile router has expired (e.g., the mobility binding table entry is deleted upon expiration of the specified lifetime) at block 602, the Home Agent and the mobile router perform substantially the same functions as described above with reference to FIG. 5 describing the functions performed upon deregistration of the mobile router. Thus, at block 604, the Home Agent deallocates the networks associated with the mobile router by replacing the networks to a pool of available networks. In addition, the Home Agent deletes the appropriate Mobility Binding Table entry, deletes the tunnel between the mobile router and the Home Agent, and deletes the appropriate networks or entries from the routing table at block 606. The mobile router similarly removes the appropriate networks from its private DHCP pool at block 608 and deconfigures the previously allocated networks from its interface(s) at block 610. At block 612, the mobile router deletes the tunnel between the mobile router and the Home Agent as well as the appropriate registration entry from its registration table.

The present invention enables networks to be allocated dynamically to a mobile router during the registration process. As a result, networks need not be allocated statically to the mobile router. Moreover, address space is conserved since networks are only allocated to "active" mobile routers.

It is important to note that each AAA server implemented for purposes of managing a pool of available networks may provide conventional authentication and accounting services as well as authorization services. RADIUS and TACACS+ conventionally provide authentication, authorization, and accounting services. Thus, these protocols are well suited for the servers of the present invention. However, the invention is not limited to these protocols. Other authentication, authorization, and accounting protocols may be used.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Referring now to FIG. 7, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and registration tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A Home Agent supporting Mobile IP, comprising:
a processor; and
a memory, at least one of the processor or the memory being configured for:
receiving a registration request packet from a mobile router, the registration request packet including a network allocation extension indicating one or more networks being requested by the mobile router from the Home Agent;
allocating the one or more networks to the mobile router corresponding to the one or more networks being requested by the mobile router from the Home Agent; and
sending a registration reply packet to the mobile router, the registration reply including a network allocation extension identifying the one or more networks allocated to the mobile router by the Home Agent.

2. The Home Agent as recited in claim 1, at least one of the processor or the memory being further configured for:
authenticating the mobile router prior to allocating the one or more networks to the mobile router and sending the registration reply packet to the mobile router.

3. The Home Agent as recited in claim 1, wherein the network allocation extension of the registration request packet indicates a number of subnets being requested by the mobile router.

4. The Home Agent as recited in claim 1, wherein the network allocation extension of the registration request packet indicates a size of the one or more networks being requested by the mobile router from the Home Agent.

5. The Home Agent as recited in claim 1, wherein allocating the one or more networks to the mobile router comprises:
allocating the one or more networks from a local pool of available networks, the local pool being managed by the Home Agent.

6. The Home Agent as recited in claim 1, wherein allocating the one or more networks to the mobile router comprises:
allocating the one or more networks from a DHCP server that manages a pool of available networks.

7. The Home Agent as recited in claim 1, wherein allocating the one or more networks to the mobile router comprises:
allocating the one or more networks from a AAA server that manages a pool of available networks.

8. The Home Agent as recited in claim 1, at least one of the processor or the memory being further configured for:
updating a routing table to include one or more entries for the one or more networks that are allocated to the mobile router, wherein each entry in the routing table includes a care-of address associated with the one or more networks.

9. The Home Agent as recited in claim 8, at least one of the processor or the memory being further configured for:
updating the routing table to remove the one or more entries when a lifetime of the mobile router has expired.

10. The Home Agent as recited in claim 8, at least one of the processor or the memory being further configured for:
receiving a deregistration request from the mobile router; and
updating the routing table to remove the one or more networks from the routing table.

11. The Home Agent as recited in claim 8, at least one of the processor or the memory being further configured for:
receiving a deregistration request from the mobile router; and
updating the routing table to remove the one or more entries from the routing table.

12. The Home Agent as recited in claim 8, at least one of the processor or the memory being further configured for:
receiving a deregistration request from the mobile router; and
updating the mobility binding table to remove the association between the mobile router and the care-of address.

13. The Home Agent as recited in claim 1, at least one of the processor or the memory being further configured for:
updating a mobility binding table to associate the mobile router with a care-of address.

14. The Home Agent as recited in claim 13, at least one of the processor or the memory being further configured for:
updating the mobility binding table to remove the association between the mobile router and the care-of address when a lifetime of the mobile router has expired.

15. The Home Agent as recited in claim 1, at least one of the processor or the memory being further configured for:
deallocating the one or more networks previously allocated to the mobile router when a lifetime of the mobile router has expired.

16. The Home Agent as recited in claim 15, wherein deallocating the one or more networks previously allocated to the mobile router comprises:
replacing the one or more networks to a pool of available networks.

17. The Home Agent as recited in claim 1, at least one of the processor or the memory being further configured for:
receiving a deregistration request from the mobile router; and deallocating the one or more networks previously allocated to the mobile router.

18. The Home Agent as recited in claim 17, wherein deallocating the one or more networks previously allocated to the mobile router comprises:
   replacing the one or more networks to a pool of available networks.

19. The Home Agent as recited in claim 17, wherein at least one of the processor or the memory being further configured for:
   sending a deregistration reply to the mobile router.

20. The Home Agent as recited in claim 1, wherein each of the networks requested by the mobile router includes more than one address.

21. The Home Agent as recited in claim 1, wherein each of the networks allocated to the mobile router includes more than one address.

22. A computer readable medium storing thereon computer-readable instructions that, when executed on a computer, cause the computer to implement a Home Agent supporting Mobile IP, the computer readable medium comprising:
   instructions for processing a registration request packet received from a mobile router, the registration request packet including a network allocation extension indicating one or more networks being requested by the mobile router from the Home Agent;
   instructions for allocating the one or more networks to the mobile router corresponding to the one or more networks being requested by the mobile router from the Home Agent; and
   instructions for sending a registration reply packet to the mobile router, the registration reply including a network allocation extension identifying the one or more networks allocated to the mobile router.

23. The computer readable medium as recited in claim 22, further comprising:
   instructions for authenticating the mobile router prior to allocating the one or more networks to the mobile router and sending the registration reply packet to the mobile router.

24. The computer readable medium as recited in claim 22, wherein the registration request packet indicates a number of subnets being requested by the mobile router.

25. The computer readable medium as recited in claim 22, wherein the registration request indicates a size of the one or more networks being requested by the mobile router from the Home Agent.

26. The computer readable medium as recited in claim 22, wherein the instructions for allocating the one or more networks to the mobile router comprises:
   instructions for allocating the one or more networks from a local pool of available networks, the local pool being managed by the Home Agent.

27. The computer readable medium as recited in claim 22, wherein the instructions for allocating the one or more networks to the mobile router comprises:
   instructions for allocating the one or more networks from a DHCP server that manages a pool of available networks.

28. The computer readable medium as recited in claim 22, wherein the instructions for allocating the one or more networks to the mobile router comprises:
   instructions for allocating the one or more networks from a AAA server that manages a pool of available networks.

29. The computer readable medium as recited in claim 22, further comprising:
   instructions for updating a routing table to include one or more entries for the one or more networks that are allocated to the mobile router, wherein each entry in the routing table includes a care-of address associated with the one or more networks.

30. The computer readable medium as recited in claim 29, further comprising:
   instructions for updating the routing table to remove the one or more entries when a lifetime of the mobile router has expired.

31. The computer readable medium as recited in claim 29, further comprising:
   instructions for receiving a deregistration request from the mobile router; and
   instructions for updating the routing table to remove the one or more networks from the routing table.

32. The computer readable medium as recited in claim 29, further comprising:
   instructions for receiving a deregistration request from the mobile router; and
   instructions for updating the routing table to remove the one or more entries from the routing table.

33. The computer readable medium as recited in claim 29, further comprising:
   instructions for receiving a deregistration request from the mobile router; and
   instructions for updating the mobility binding table to remove the association between the mobile router and the care-of address.

34. The computer readable medium as recited in claim 22, further comprising:
   instructions for updating a mobility binding table to associate the mobile router with a care-of address.

35. The computer readable medium as recited in claim 34, further comprising:
   instructions for updating the mobility binding table to remove the association between the mobile router and the care-of address when a lifetime of the mobile router has expired.

36. The computer readable medium as recited in claim 22, further comprising:
   instructions for deallocating the one or more networks previously allocated to the mobile router when a lifetime of the mobile router has expired.

37. The computer readable medium as recited in claim 36, wherein the instructions for deallocating the one or more networks previously allocated to the mobile router comprises:
   instructions for replacing the one or more networks to a pool of available networks.

38. The computer readable medium as recited in claim 22, further comprising:
   instructions for receiving a deregistration request from the mobile router; and
   instructions for deallocating the one or more networks previously allocated to the mobile router.

39. The computer readable medium as recited in claim 38, wherein the instructions for deallocating the one or more networks previously allocated to the mobile router comprises:
   instructions for replacing the one or more networks to a pool of available networks.

40. The computer readable medium as recited in claim 38, further comprising:
   instructions for sending a deregistration reply to the mobile router.

41. A Home Agent supporting Mobile IP, comprising:

means for receiving a registration request packet from a mobile router, the registration request packet including a network allocation extension indicating one or more networks being requested by the mobile router from the Home Agent;

means for allocating the one or more networks to the mobile router corresponding to the one or more networks being requested by the mobile router from the Home Agent; and means for sending a registration reply packet to the mobile router, the registration reply including a network allocation extension identifying the one or more networks allocated to the mobile router, thereby enabling the mobile router to configure interfaces of the mobile router with IP addresses in the one or more networks.

42. In a Home Agent supporting Mobile IP, a method comprising:

receiving a registration request packet from a mobile router, the registration request packet including a network allocation extension indicating one or more networks being requested by the mobile router from the Home Agent;

allocating the one or more networks to the mobile router corresponding to the one or more networks being requested by the mobile router from the Home Agent; and sending a registration reply packet to the mobile router, the registration reply including a network allocation extension identifying the one or more networks allocated to the mobile router, thereby enabling the mobile router to configure interfaces of the mobile router with IP addresses in the one or more networks.

43. The method as recited in claim 42, further comprising:

authenticating the mobile router prior to allocating the one or more networks to the mobile router and sending the registration reply packet to the mobile router.

44. The method as recited in claim 42, wherein the registration request packet indicates a number of subnets being requested by the mobile router.

45. The method as recited in claim 42, wherein the registration request indicates a size of the one or more networks being requested by the mobile router from the Home Agent.

46. The method as recited in claim 42, wherein allocating the one or more networks to the mobile router comprises:

allocating the one or more networks from a local pool of available networks, the local pool being managed by the Home Agent.

47. The method as recited in claim 42, wherein allocating the one or more networks to the mobile router comprises:

allocating the one or more networks from a DHCP server that manages a pool of available networks.

48. The method as recited in claim 42, wherein allocating the one or more networks to the mobile router comprises:

allocating the one or more networks from a AAA server that manages a pool of available networks.

49. The method as recited in claim 42, further comprising:

updating a routing table to include one or more entries for the one or more networks that are allocated to the mobile router, wherein each entry in the routing table includes a care-of address associated with the one or more networks.

50. The method as recited in claim 49, further comprising:

updating the routing table to remove the one or more entries when a lifetime of the mobile router has expired.

51. The method as recited in claim 49, further comprising:

receiving a deregistration request from the mobile router; and updating the routing table to remove the one or more networks from the routing table.

52. The method as recited in claim 49, further comprising:

receiving a deregistration request from the mobile router; and updating the routing table to remove the one or more entries from the routing table.

53. The method as recited in claim 49, further comprising:

receiving a deregistration request from the mobile router; and updating the mobility binding table to remove the association between the mobile router and the care-of address.

54. The method as recited in claim 42, further comprising:

updating a mobility binding table to associate the mobile router with a care-of address.

55. The method as recited in claim 54, further comprising:

updating the mobility binding table to remove the association between the mobile router and the care-of address when a lifetime of the mobile router has expired.

56. The method as recited in claim 42, further comprising:

deallocating the one or more networks previously allocated to the mobile router when a lifetime of the mobile router has expired.

57. The method as recited in claim 56, wherein deallocating the one or more networks previously allocated to the mobile router comprises:

replacing the one or more networks to a pool of available networks.

58. The method as recited in claim 42, further comprising:

receiving a deregistration request from the mobile router; and deallocating the one or more networks previously allocated to the mobile router.

59. The method as recited in claim 58, wherein deallocating the one or more networks previously allocated to the mobile router comprises:

replacing the one or more networks to a pool of available networks.

60. The method as recited in claim 58, further comprising:

sending a deregistration reply to the mobile router.

61. The method as recited in claim 42, wherein each of the networks requested by the mobile router includes more than one address.

62. The method as recited in claim 42, wherein each of the networks allocated to the mobile router includes more than one address.

* * * * *